United States Patent Office 3,450,759
Patented June 17, 1969

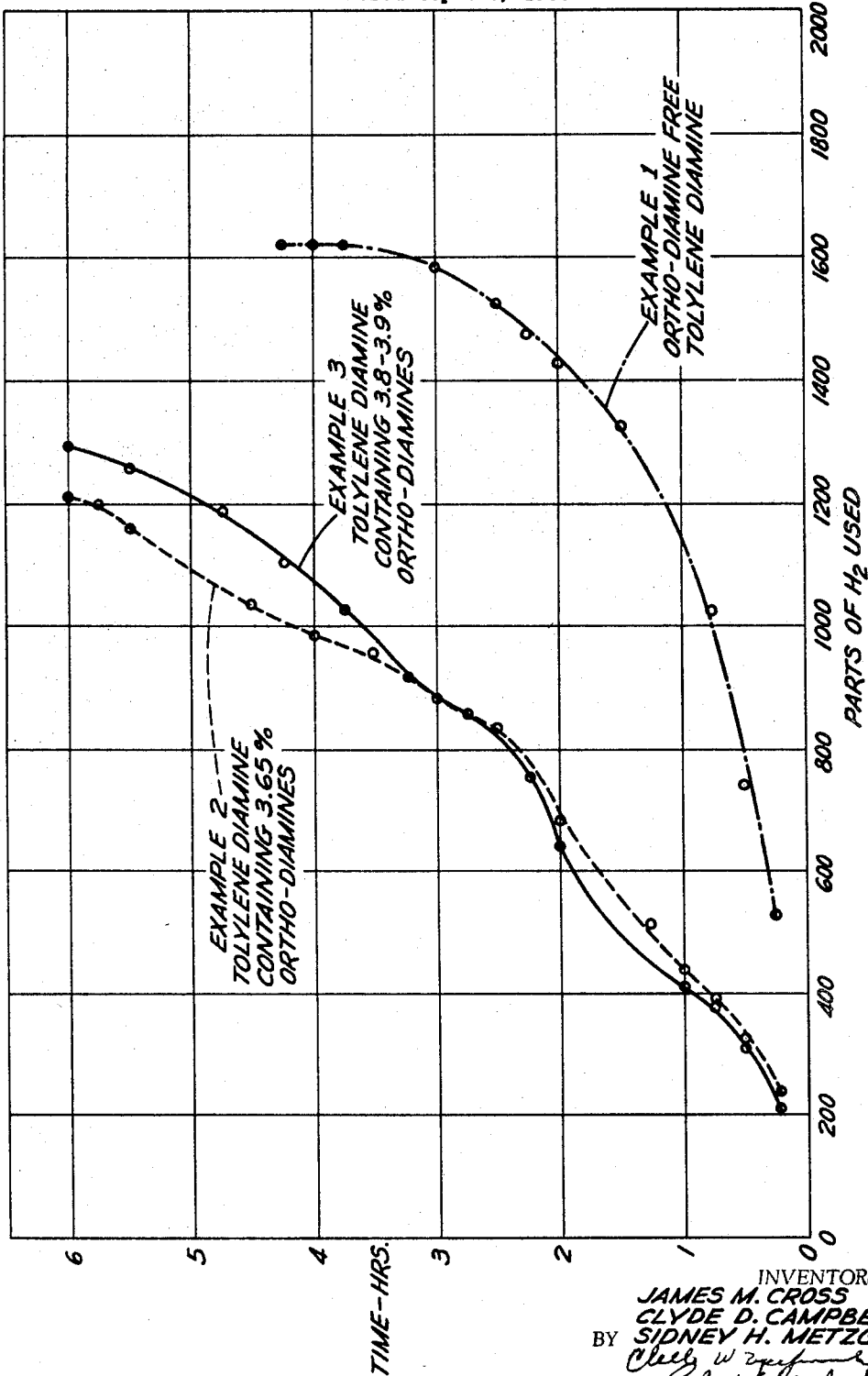

3,450,759
PREPARATION OF CYCLOALIPHATIC DIAMINES FREE OF o-DIAMINES
James M. Cross, New Martinsville, Clyde D. Campbell, Wheeling, and Sidney H. Metzger, New Martinsville, W. Va., assignors to Mobay Chemical Company, Pittsburgh, Pa., a corporation of Delaware
Filed Sept. 7, 1965, Ser. No. 485,386
Int. Cl. C07c 87/28, 91/16, 87/64
U.S. Cl. 260—563                                   7 Claims

ABSTRACT OF THE DISCLOSURE

Production of cycloaliphatic diamines by removing the o-aromatic diamines from aromatic diamines and hydrogenating the substantially o-diamine free aromatic diamines.

---

This invention relates to the preparation of cycloaliphatic diamines and more particularly, to the reduction of aromatic diamines to the corresponding cycloaliphatic diamines. The invention is more specifically related to the hydrogenation of aromatic diamines having at least two amino groups on the same benzene ring and especially to the preparation of hexahydrotolylene diamine by the hydrogenation of tolylene diamines.

It has been heretofore known to hydrogenate aromatic diamines containing two or more amino groups on the same benzene ring. While the hydrogenation of aromatic amines containing only one amino group on a benzene ring is accomplished readily, when two or more amino groups are present in the same benzene ring, the conversion of the aromatic compound to the cycloaliphatic compound takes place only with great difficulty.

Tolylene diamine, an intermediate for the preparation of tolylene diisocyanate is prepared by dinitrating toluene, and reducing the dinitro compound thus formed to the diamine. In this process, the major constituents of the dinitration and reduction processes are the 2,4- and 2,6-isomers of toluene. However, other positional isomers including those having amino groups in the o-position with respect to each other, such as, 2,3-tolylene diamine and 3,4-tolylene diamine are present in small quantities. These o-diamines generally are present in the range of from about 2 to about 5 percent.

The hydrogenation of tolylene diamine in order to obtain a cycloaliphatic diamine has been heretofore known. However, it is a very difficult reaction to conduct and the yields are low.

It is therefore an object of this invention to provide an improved process for preparing cycloaliphatic diamines. It is another object of this invention to provide an improved process for converting aromatic diamines to cycloaliphatic diamines in good yields. It is another object of this invention to provide an improved method of hydrogenating aromatic diamines having two or more amino groups on the same benzene ring. It is another object of this invention to provide an improved process for making hexahydrotolylene diamine. It is another object of this invention to provide a process for converting a tolylene diamine to hexahydrotolylene diamine in good yields. It is still another object of this invention to provide an improved method of hydrogenating tolylene diamine to hexahydrotolylene diamine.

The foregoing objects and others which will become apparent from the following description and the accompanying graph shown in the figure are accomplished in accordance with the invention generally speaking by providing a process for preparing cycloaliphatic diamines by hydrogenating aromatic diamines that are substantially free of o-diamines. Thus, the invention contemplates first treating the aromatic diamines to remove the o-diamines present and then to hydrogenate the remaining isomeric mixture of diamines in the presence of hydrogen and a hydrogenation catalyst.

A common method of preparing aromatic diamines is to nitrate the aromatic nucleus in order to provide $—NO_2$ substituents on the benzene ring. This is the prime method of preparing dinitrotoluene for use in the preparation of an isomeric mixture of tolylene diamines which are subsequently converted by phosgenation to the isomeric mixture of tolylene diisocyanate. While the position that the nitro groups enter the benzene ring can be controlled to a certain extent, the nitration is always accomplished by the formation of a small percentage of from about 2 to about 5 percent of ortho isomers. This is true regardless of the aromatic ring being nitrated. Thus, when benzene is nitrated in a like manner, the formation of different isomers results. Upon hydrogenation, the same ratio of isomers is present in the thus formed diamine. It has been found that the o-aromatic diamines present cause the hydrogenation to the corresponding cycloaliphatic amines to proceed only with great difficulty. Upon removal of the o-diamines, the hydrogenation proceeds much more smoothly with much higher yields. The invention herein is thus applicable to the hydrogenation of any aromatic diamines wherein o-aromatic diamine isomers are present.

Any isomeric mixture of aromatic diamines or mixture of different diamines having at least two amino groups on a benzene ring may be treated in accordance with this invention for conversion to the cycloaliphatic compound, such as, for example, phenylene diamines, tolylene diamines, naphthylene diamines, chlorophenylene diamines, biphenylene diamines, diphenyl ether diamines, diphenylmethane diamines and the like. The invention is particularly applicable to the preparation of hexahydrotolylene diamines because of the availability of isomeric mixtures of tolylene diamine used in the preparation of tolylene diisocyanate. For the purpose of simplicity, while the invention resides in the conversion of any aromatic diamine containing a small percentage of o-diamines to the corresponding cycloaliphatic diamine, throughout the remainder of the specification, the preparation using tolylene diamines as a starting material will be discussed.

It has been found that tolylene diamine, obtained by the sequential steps of nitrating and reducing toluene is very difficult to hydrogenate in order to obtain a cycloaliphatic diamine because of the presence of the o-tolylene diamine isomers. However, when the tolylene diamine is first treated in order to remove the o-diamines, the conversion of the aromatic diamines to the cycloaliphatic diamines is readily accomplished by simple hydrogenation techniques.

Any suitable technique for removing the o-diamines from tolylene diamine can be used in order to obtain a tolylene diamine substantially free of o-diamines. This can be accomplished by carefully controlled distillation, by reaction with carbon disulfide such as disclosed and claimed in U.S. Patent 3,134,813, by the process of U.S. Patent 3,149,162 or by the reaction with carbon dioxide such as disclosed and claimed in our co-pending application Ser. No. 438,390.

In the hydrogenation step of the reaction, any suitable temperature, pressure and hyrogenation catalyst can be used such as, for example, platinum, palladium, nickel, Raney nickel, rhodium, ruthenium, copper, iron, chromium, molybdenum, tungsten, cobalt, their oxides and sulfides and the like. Further, suitable catalysts are disclosed in U.S. Patent 2,511,028. The particular temperature and pressure do not form the basis of patentability, however, a temperature range of from about 110° C. to about 200° C. and a pressure range of from about 2000 p.s.i.g. to about 6000 p.s.i.g. are preferred.

The invention is further illustrated but not limited by the following examples in which parts are by weight unless otherwise specified.

Example 1.—Preparation of o-diamine free tolylene diamine

About 490 parts of an isomeric mixture of tolylene diamine having from about 3.8 to 3.9 percent of o-tolylene diamines are charged into a stainless steel stirred autoclave. This autoclave is purged with carbon dioxide to remove substantially all traces of air. The autoclave is pressurized with carbon dioxide and heated with stirring to about 240° C. for about 6 hours. The pressure in the autoclave during this time is from about 1800 to about 2000 p.s.i.g. and no control over the pressure is maintained.

About 490 parts of material are removed from the autoclave and distilled in vacuum at about 1.7 mm. Hg at a temperature of from about 125–170° C. About 430.7 parts of toluylene diamines substantially free of o-diamines are recovered in the distillation. The residue from the distillation is slurried with methanol and filtered. About 17 parts of solid are removed and this solid is identified by infra-red spectra data as being methyl benzimidazolinones. The methanol filtrate is distilled to remove the methanol and about 24 parts of toluylene diamines free of o-diamines are recovered. The total toluylene diamine free of o-toluylene diamine recovered is therefore 454.7 parts.

Example 2.—Preparation of comparison starting material

To about 96.35 parts of o-diamine free tolylene diamine as obtained in Example 1 is added about 3.65 parts of 3,4-tolylene diamine.

Example 3.—Commercial tolylene diamine

Tolylene diamine having an approximate percentage of 80% 2,4- and 20% 2,6-tolylene diamine and containing 3.8 to 3.9% of o-diamines is obtained from the commercial production of tolylene diamine by the nitration and reduction of toluene.

Example 4

To three different portions each of about 600 parts by volume of dioxane (dried over sodium and distilled) is added about 156 parts of molten tolylene diamine as described in Examples 1 through 3 respectively. The mixture in each case is poured into an autoclave to which is added about 5 parts of ruthenium dioxide. The autoclaves are purged 8 times with hydrogen at a pressure of from about 200–250 p.s.i.g. in order to insure the removal of all the air therein. The autoclaves are pressured to about 1325 p.s.i.g. and the material is agitated and heated to a temperature of about 140° C. At this elevated temperature, the pressure within the autoclaves is from about 3000 to about 4000 p.s.i.g. and no attempt is made to control this pressure.

The results of Example 4 with the three different starting materials is set forth in the following table and the attached figure:

| Example No. | o-Diamine content, percent | Hydrogenation time, hours | Parts of hydrogen used | Yield cycloaliphatic diamine, percent |
|---|---|---|---|---|
| 1 | 0 | 4.5 | 1,600 | 85 |
| 2 | 3.65 | 6 | 1,200 | 54.5 |
| 3 | 3.8–3.9 | 6 | 1,300 | 60 |

The figure illustrates that the rate of hydrogenation of o-diamine free tolylene diamine is much faster than the rate when o-diamines are present. The total amount of hydrogen used is also greater.

It is of course to be understood that any aromatic diamine containing a small quantity of o-diamines may be used throughout the examples for the tolylene diamines, any procedure can be used for separating the o-diamines from the aromatic diamine to be hydrogenated and that any suitable hydrogenation catalyst can be used.

Although the invention has been described in considerable detail in the foregoing for the purpose of illustration it is to be understood that such detail is solely for this purpose and that variations can be made by those skilled in the art without departing from the spirit and scope of the invention.

What is claimed is:

1. A process for the production of cycloaliphatic diamines by the hydrogenation of aromatic diamines which comprises removing the o-aromatic diamine isomers from said aromatic diamine and hydrogenating the substantially o-dimine free aromatic diamines.

2. A process for the preparation of cycloaliphatic diamines having at least two amino groups on the same ring by the hydrogenation of aromatic diamines having at least two amino groups on the same benzene ring which comprises treating said aromatic diamine to remove substantially all of the o-aromatic diamines present and reducing the o-diamine free aromatic diamine to the cycloaliphatic diamine.

3. A process for the preparation of hexahydrotolylene diamine which comprises separating the o-diamine isomers from the tolylene diamine and hydrogenating said substantially o-isomer free tolylene diamine.

4. The process of claim 1 wherein the hydrogenation is conducted at a temperature of from about 110° C. to about 220° C. and a pressure of from about 2000 p.s.i.g. to about 6000 p.s.i.g. in the presence of a catalytic amount of a hydrogenation catalyst.

5. A process for the production of an isomeric mixture of about 80% 2,4- and about 20% 2,6-hexahydrotolylene diamine by hydrogenation of an isomeric mixture of tolylene diamines which comprises removing the o-diamine isomers from said isomeric mixture of tolylene diamines and hydrogenating the isomeric mixture of about 80% 2,4- and about 20% 2,6-tolylene diamine, said isomeric mixture being substantially free of o-tolylene diamine.

6. A process for the production of 2,4-hexahydrotolylene diamine by hydrogenation of 2,4-tolylene diamine which comprises removing the o-aromatic isomers from said 2,4-tolylene diamine and hydrogenating the 2,4-tolylene diamine, said 2,4-tolylene diamine being substantially free of o-isomers.

7. A process for the production of 2,6-hexahydrotolylene diamine by hydrogenation of 2,6-tolylene diamine which comprises removing the o-aromatic isomers from said 2,6-tolylene diamine and hydrogenating the 2,6-tolylene diamine, said 2,6-tolylene diamine being substantially free of o-isomers.

References Cited

UNITED STATES PATENTS

| | | | |
|---|---|---|---|
| 1,927,129 | 9/1933 | Lommel et al. | 260—563 |
| 2,511,028 | 6/1950 | Whitman | 260—570.5 |
| 3,134,813 | 5/1964 | Pelley | 260—582 |
| 3,149,162 | 9/1964 | Gardner et al. | 260—580 |
| 3,163,675 | 12/1964 | Smith | 260—563 |

CHARLES B. PARKER, *Primary Examiner.*

PATRICIA C. IVES, *Assistant Examiner.*

U.S. Cl. X.R.

260—570, 571, 578, 583